W. T. BANCROFT & N. W. VAN LIEW.
SANITARY DRINKING FOUNTAIN.
APPLICATION FILED AUG. 16, 1910.

983,472.

Patented Feb. 7, 1911.

Witnesses:
R. M. Imboden,
E. L. Morrison

Inventors:
W. T. Bancroft
and N. W. Van Liew,
By F. G. Fischer, atty.

THE NORRIS PETERS CO., WASHINGTON, D. C.

UNITED STATES PATENT OFFICE.

WILLIAM T. BANCROFT AND NEILSON W. VAN LIEW, OF KANSAS CITY, MISSOURI.

SANITARY DRINKING-FOUNTAIN.

983,472.      Specification of Letters Patent.      Patented Feb. 7, 1911.

Application filed August 16, 1910. Serial No. 577,491.

*To all whom it may concern:*

Be it known that we, WILLIAM T. BANCROFT and NEILSON W. VAN LIEW, citizens of the United States, residing at Kansas City, in the county of Jackson and State of Missouri, have invented certain new and useful Improvements in Sanitary Drinking-Fountains, of which the following is a specification.

Our invention relates to improvements in sanitary drinking fountains, and our main object is to provide a fountain which may be used on public thoroughfares without fear of spreading glanders and other contagious diseases common to horses and other equines.

The invention further provides for watering canines and felines.

Figure 1:
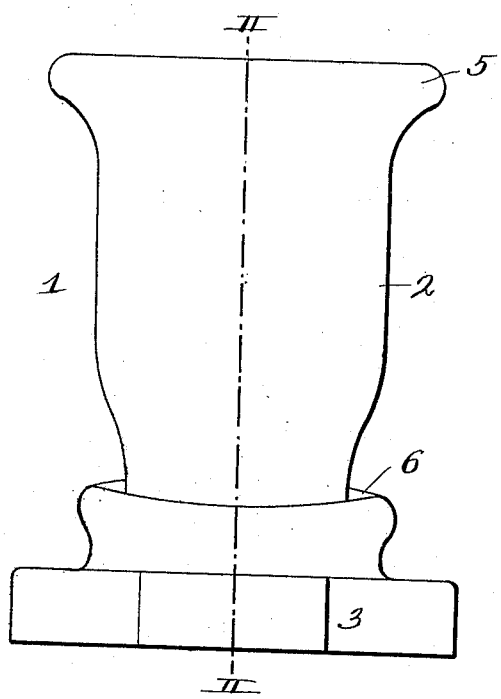
Figure 2:
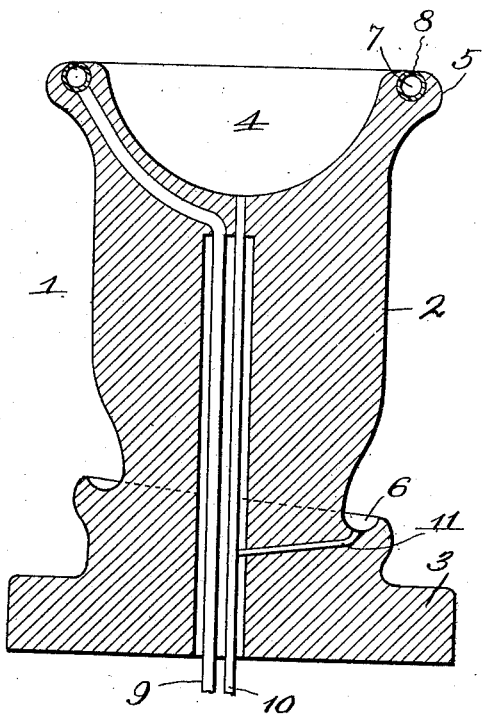
Figure 3:
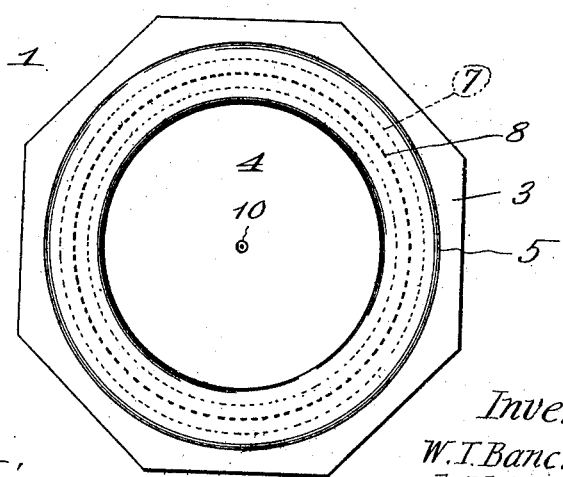

It is a well-known fact that the ordinary public drinking fountain constitutes a grave source of danger in the dissemination of contagious diseases, due to the common habit equines have of rubbing their noses on the rim of the fountain, with the result that mucus deposited by a diseased animal may be taken into the systems of animals subsequently drinking at said fountain. We eliminate this danger by having a sheet of water overflow the rim of the fountain, thereby cleansing the same of any matter which may be deposited thereon; and in order that the invention may be fully understood, reference will now be made to the accompanying drawing, in which:

Figure 1 is a side elevation of the fountain. Fig. 2 is a central vertical section on line II—II of Fig. 1. Fig. 3 is a plan view of the fountain.

1 designates the fountain which is made of concrete or other like material, and comprises a body portion 2, a base 3, and a basin 4, having an annular rim 5. Body portion 2 is provided at its lower portion with an inclined annular trough 6.

7 designates an annular pipe embedded in rim 5, and provided at its upper portion with a series of slots or ports 8 through which water may be discharged on rim 7.

9 designates a supply pipe extending upward through the fountain and connected at one end with a source of water supply (not shown) and at its opposite end with pipe 7.

10 designates an outlet pipe leading downward through the fountain from basin 4 and preferably connected at its lower end to a sewer (not shown).

11 designates a drain pipe leading from the lower side of trough 6 to outlet pipe 10, the upper end of which latter is flush with the bottom of basin 4 to prevent collection of mucus or other foreign matter likely to infect animals drinking from the basin.

In practice water is conducted by pipe line to pipe 7 from which it discharges through the slots or ports 8. A portion of the water thus discharged flows into the basin 4 while the remainder flows over the rim 5, thence down the side of the fountain and into trough 6, where it is accessible to canines and felines. After basin 4 becomes filled the water overflows therefrom down the side of the fountain to the trough, it following the side of the fountain through the action of capillary attraction.

From the foregoing description it is apparent that a sheet of water is constantly overflowing rim 5, thereby keeping the same free from the collection of mucus or other foreign matter, and thereby preventing the spread of disease to animals drinking at the fountain. The collection of the overflow from rim 5 by trough 6 from which the water is conducted through drain pipe 11, prevents the water from flowing upon the pavement adjacent to the fountain.

Having thus described our invention, what we claim is:

1. A drinking fountain embodying a basin, a pipe having ports through which water is discharged on the rim of said basin, and an outlet pipe for the basin having a port of less area than the discharge ports of the first-mentioned pipe.

2. A drinking fountain embodying a basin, means for discharging a sheet of water on the rim of said basin, and a trough on the fountain for collecting a portion of the water discharged on said rim.

3. A drinking fountain embodying a basin, means for discharging a sheet of water on the rim of said basin, and a trough surrounding the fountain to collect the water flowing over said rim.

4. A drinking fountain embodying a basin, means for discharging a sheet of water on the rim of said basin, an inclined trough surrounding the fountain to gather the water flowing over said rim, and means for conducting the water from said trough.

In testimony whereof we affix our signatures, in the presence of two witnesses.

WILLIAM T. BANCROFT.
NEILSON W. VAN LIEW.

Witnesses:
F. G. FISCHER,
E. L. MORRISON.